G. L. SCHOFIELD.
COOLING MEANS FOR MOTOR VEHICLE ENGINES.
APPLICATION FILED MAY 17, 1920.
1,396,785.
Patented Nov. 15, 1921.
2 SHEETS—SHEET 1.
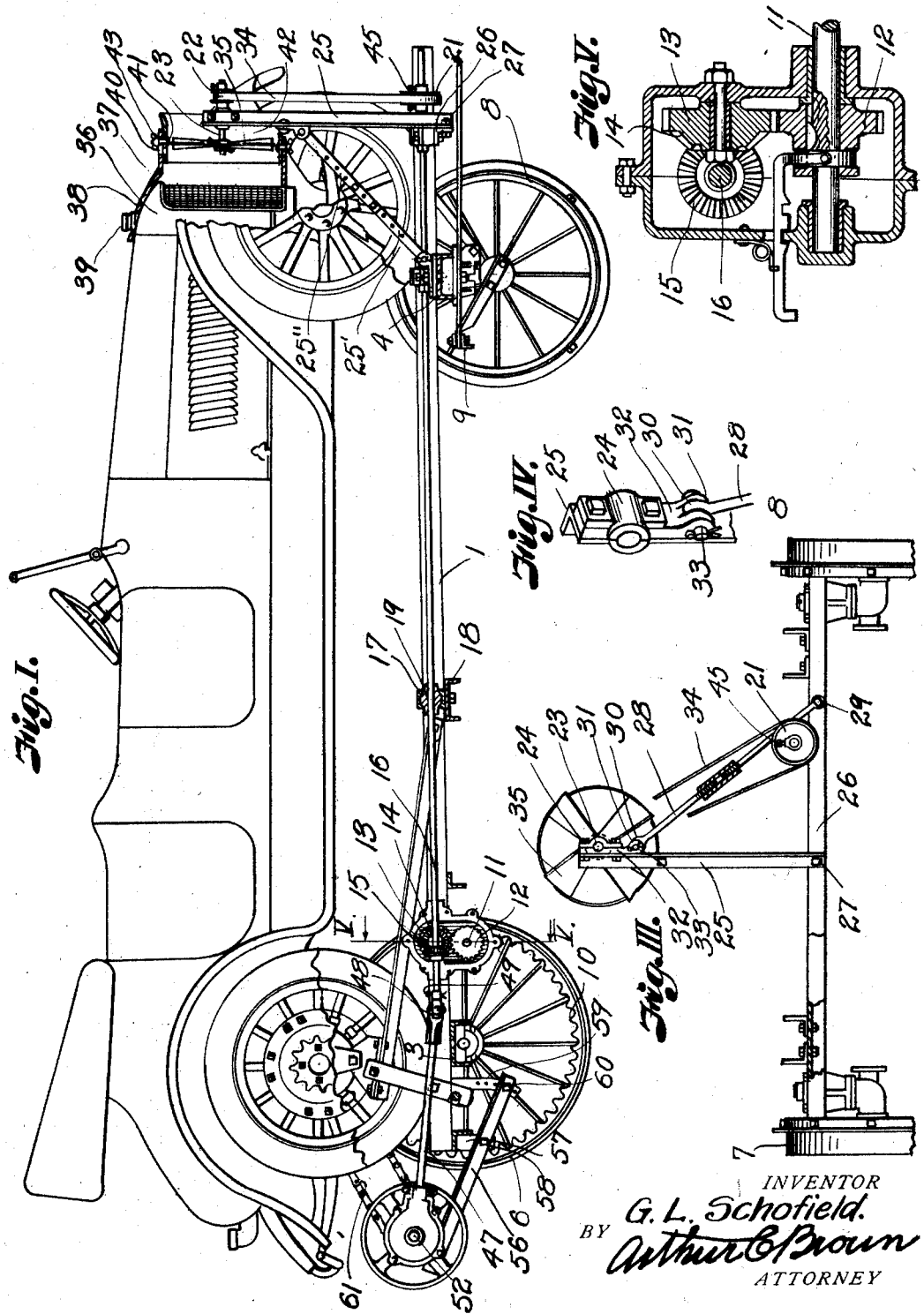
INVENTOR
G. L. Schofield.
BY Arthur C. Brown
ATTORNEY G. L. SCHOFIELD.
COOLING MEANS FOR MOTOR VEHICLE ENGINES.
APPLICATION FILED MAY 17, 1920.
1,396,785.
Patented Nov. 15, 1921.
2 SHEETS—SHEET 2.
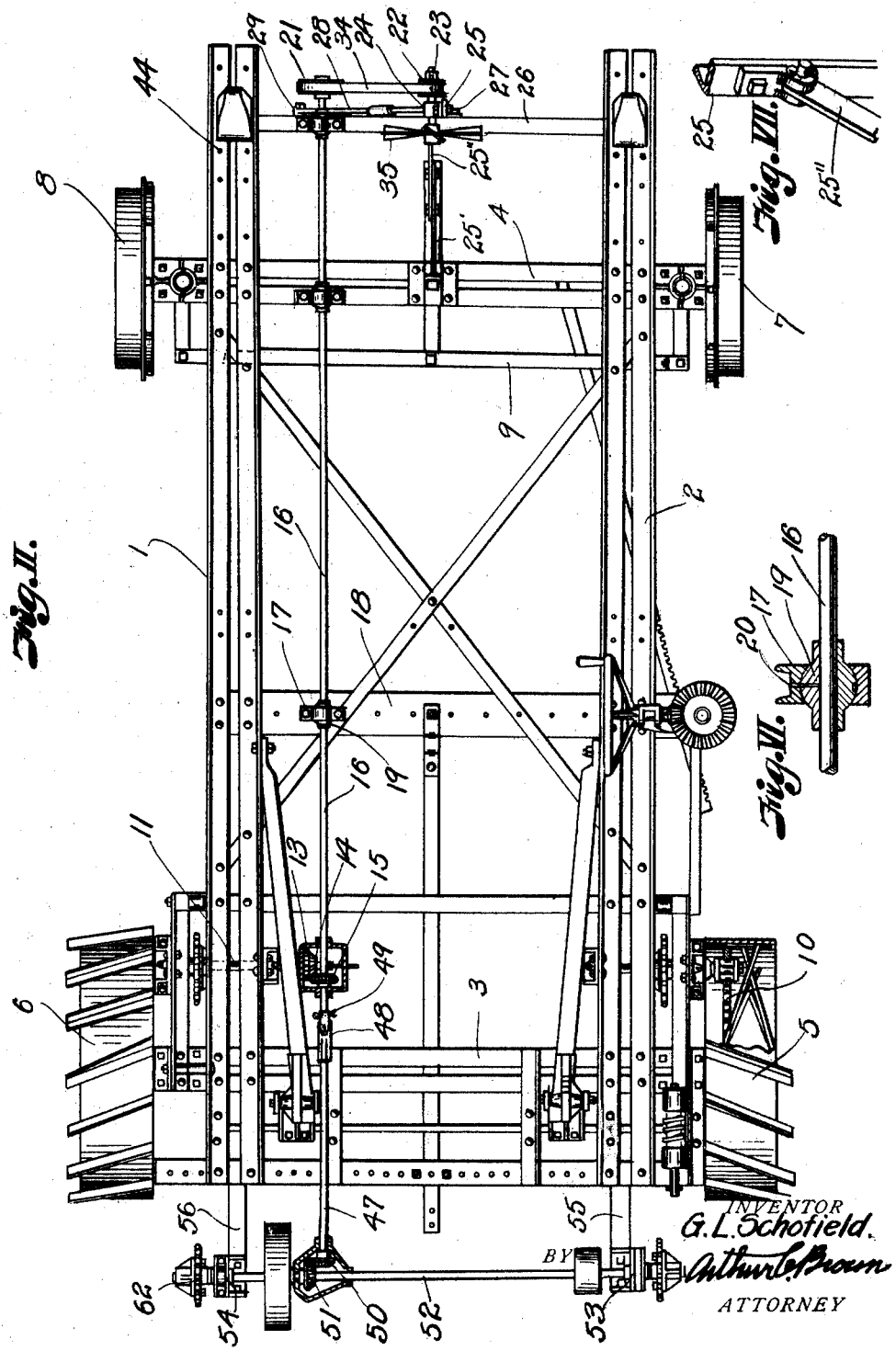
INVENTOR
G. L. Schofield.
BY
Arthur L. Brown
ATTORNEY

UNITED STATES PATENT OFFICE.

GEORGE L. SCHOFIELD, OF KANSAS CITY, MISSOURI.

COOLING MEANS FOR MOTOR-VEHICLE ENGINES.

1,396,785. Specification of Letters Patent. Patented Nov. 15, 1921.

Original application filed July 1, 1918, Serial No. 242,911. Divided and this application filed May 17, 1920. Serial No. 382,127.

*To all whom it may concern:*

Be it known that I, GEORGE L. SCHOFIELD, a citizen of the United States, residing at Kansas City, in the county of Jackson and State of Missouri, have invented certain new and useful Improvements in Cooling Means for Motor-Vehicle Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This is a division of application Serial No. 242,911, filed by me on or about July 1, 1918 for "Auto tractor," and relates to a cooling means for motor vehicle engines. The invention primarily contemplates the provision of means whereby an air moving mechanism may be operated exteriorly of the motor fan of the motor vehicle.

The invention is particularly adapted for use in connection with that type of tractor in which a tractor frame is provided which is adapted to support a pleasure vehicle as the prime mover for the driven parts associated by the tractor frame. When the pleasure vehicle is functioning in its usual manner, it ordinarily travels at a sufficient rate of speed to force a considerable quantity of air through the radiator grid. Therefore, it is not essential that the major quantity of air be moved by the motor fan. When, however, the pleasure vehicle is supported upon the tractor frame, so that it communicates power to the traction wheels to move the tractor frame over the field, it travels at a relatively slow rate of speed, or when the tractor frame is still and the motor vehicle is being used as an auxiliary power device for driving a circular saw, pump or the like, there is no movement of the air through the grids except such as is displaced by the motor fan. Under such conditions, the standard motor fan has not sufficient capacity to move large enough volumes of air to efficiently cool the engine and I have, therefore, provided means whereby the supply of air can be augmented by an auxiliary fan so that a sufficient volume of air will pass through the radiator grid and over the motor to effect the necessary cooling of the parts.

I have provided means whereby there will be an efficient current of air distributed over the motor whether the motor is stationary or whether it is traveling at a relatively low speed, and this is accomplished by means independent of the normal motor vehicle mechanism.

The device will be described and illustrated in connection with a tractor frame but certain features of the invention, such as the fan and operating mechanism *per se*, need not necessarily be associated with a tractor since it is capable of operating with suitable driving mechanism to augment the air supply whenever the motor vehicle is serving as a power plant for commercial purposes and in some aspects of the case, the novelty resides in providing an auxiliary fan for supplying a current of air over any form of stationary motor.

In the drawings,

Figure I is a side elevational view of a tractor frame, a motor vehicle, and an auxiliary fan with its operating mechanism.

Fig. II is a plan view of the invention with the motor vehicle removed and applied to a tractor frame.

Fig. III is a front view of a tractor frame, showing the fan and operating mechanism applied.

Fig. IV is a detail view of a detachable connection between a brace and the fan supporting standard.

Fig. V is a sectional view through certain gearing for the fan driving mechanism.

Fig. VI is a sectional view through a shaft bearing for a shaft extending longitudinally of the frame to drive the fan, and Fig. VII is a perspective view of a side brace connection.

The frame is shown as consisting of side members 1 and 2 connected by transverse bars 3 and 4, which constitute the bolsters and serve as means for supporting the wheel axles. The particular construction of the frame is not important in this application, but the traction wheels 5 and 6 are driven from a suitable source of power, the front wheels 7 and 8 serving as steering wheels which may operate in response to movement of the steering link 9, controlled from a suitable steering mechanism.

One of the traction wheels, for example the one designated 6, is provided with an internal rack 10, which is driven from the shaft 11 on which is mounted a slidable or shiftable gear 12, meshing with a spur gear 13 having a beveled gear face 14, in turn meshing with a beveled gear 15 on the longitudinal shaft 16. The shaft 16 extends to the forward part of the vehicle and is supported in socket bearings 17, shown as mounted on the transverse bar 18 and on the bolster 4. The socket bearings 17 embrace the ball-shaped collars 19 on the shaft 16 so that when the frame consisting of the bars 1, 2, 3 and 4 flexes, there will be no liability of binding of the shaft in its bearings.

There is a lubricating opening 20, which passes through the bearings 17 and the collars 19, as best shown in Fig. VI.

The front end of the shaft 16 carries a pulley 21, which drives a pulley 22 on a shaft 23 in bearings 24 on the standard 25, carried by the cross beam or bar 26 at the front of the machine and which is supported by the side members 1 and 2. The standard 25 is preferably supported on the cross beam or bar 26 by a single bolt 27 and is braced in its vertical position by a diagonal brace 28, also supported on the bar 26 by a single bolt 29 and having an eye 30 at its upper end adapted to pass between the bifurcated end 31 of the bearing plate 32, constituting part of the bearing 24 for the shaft 23. There is a transverse bolt 33 passing through the bifurcated portion of plate 32 and through the eye 30 so that the brace and standard may be secured rigidly together to insure the vertical position of the standard 25 when the pulley 21 drives the pulley 22 through the belt 34. The diagonal or inclined brace 28 constitutes a link between the bar 26 and the fan standard 25 but the two parts are so related that the brace 28 may be detached from the standard to allow the standard and brace to be swung to a horizontal position if desired. For example, if the traction wheels are driven from a motor vehicle, it may become desirable to crank the same, and ordinarily the standard and brace would interfere with this, so the arrangement just described is provided so that the standard and brace may be swung out of the way whenever it is necessary to crank the car.

By reference to Figs. I, II and III it will be observed that the shaft 23 carries a fan or air impeller 35 so that when the shaft 16 and its complementary parts, including the pulleys 21 and 22 connected by the belt 34, are operating, the fan will direct a current of air toward the motor vehicle hood 36.

In order that the air from the fan will not be spilled sidewise, I have provided an air column-directing fan housing or hood 37, supported by the standard 25 and provided with an opening 38 to engage over the filler cap 39 for the radiator of the motor vehicle. The fan housing 37 is provided with a plurality of slots 40, alining with complementary slots 41 in an extensible ring or section 42, there being bolts 43 provided whereby the hood *per se* and its extensible ring may be secured together in an adjustable manner to accommodate the hood to the grid of the radiator, it being desired that the hood preferably abuts against the radiator and extends beyond the fan to prevent spilling of the air sidewise when moved by the impeller or fan 35.

The fan hood or housing may consist of a plurality of rings if desired, but one ring will ordinarily be sufficient since any extended adjustment may be effected by moving the cross bar 26 longitudinally of the machine so that it may be fastened in any of the openings or holes 44 of the respective bars 1 and 2 of the tractor frame. For example, if the vehicle with a short wheel base is employed, the bar 26 will be moved rearwardly toward the bolsters or transverse bars 4, but if a vehicle having a relatively long wheel base is employed, the bar 26 will be moved toward the front of the frame, it being only necessary in order to effect this adjustment to release the hub of the pulley 21 from the shaft 16 by unscrewing the set screw 45. It will be observed that the shaft 16 protrudes far enough from the front of the machine to permit sliding movement of the pulley 21 to be effected without disturbing its driving operation. The standard 25 is normally held in a vertical position by means of the brace 28, pivoted thereto, and adapted to be secured as above described.

The standard 25 is additionally braced by the extensible brace consisting of the members 25' and 25'', fastened to the standard 25 and the bolster 4.

If it is necessary to crank the machine, the bolt 33 will be removed so that the standard 25 with the mechanism which it supports can be swung laterally out of the way of the crank of the motor vehicle. After the machine has started, the standard will be swung up into place, as shown in Figs. I, II and III, and the fastening device or bolt 33 will be applied so that the standard will be braced with respect to the machine. Of course, where a self starter is used, the swinging movement of the standard will not be necessary, but it may be readily accomplished if desired.

By reference to the accompanying drawings, it will be seen that the device may be operated as a tractor in the usual way with all of the normal advantages and with the additional advantage that the maximum amount of air is displaced through the radiator grid so as to effect efficient cooling of the engine. Therefore, no matter how slowly the tractor is operating, there will be a maximum amount of air passing through the grid which will prevent overheating of the motor within the hood 36.

The device is sometimes used as a power plant for commercial purposes, such as driving circular saws, band saws, pumps, threshers and the like, and the necessity for a maximum amount of air becomes immediately apparent since there is no movement of the vehicle through the air and all of the displaced air must be positively moved by an impeller or fan to augment the usual fan driven by the motor.

According to the present invention when it is desired to operate the motor vehicle as a power plant for commercial purposes, certain attachments are of necessity applied and these are best shown in Figs. I and II. By reference to Figs. I and II it will be observed that the shaft 16 extends beyond the housing 46 for the gears 12, 13 and 15, which are in geared connection with the rack 10 of the wheel 5. The rear end of the shaft 16 is connected to a rearwardly extending, alining shaft 47 by a universal connection 48, which detachably engages the shaft 16 through a cotter pin 49. The rear shaft 47 is provided with a beveled gear 50, which meshes with a complementary gear 51 on a transverse shaft 52 in bearings 53 and 54 carried by the rear bars 55 and 56, which are supported to the rear brackets 57 by suitable bolts 58 and which adjustably engage the arcuate bracket 59 through the medium of a removable bolt 60. The adjustment with respect to the arcuate brackets 59 permits the brackets 55 and 56 to be swung on a pivot 58 so as to tighten the belt in the event that the shaft 52 is driven directly from the motor vehicle above the tractor frame through a chain or belt, for example, similar to the one designated 61 in Fig. I, and which is adapted to drive the shaft 52 directly through the sprocket 62.

It will be apparent that in addition to the usual air moving device or fan connected to the motor, I may provide an auxiliary fan attachment or air moving impeller which will develop a sufficient movement of air through the radiator grid to insure proper cooling of the motor vehicle which is used as a power for a tractor, and that the arrangement is such that it may be conveniently applied and easily manipulated without materially altering the construction of the tractor and in no way affecting the construction or operation of the motor vehicle *per se*.

What I claim and desire to secure by Letters-Patent is:

1. The combination with a tractor frame having a bull wheel and a motor vehicle supported on said frame and in driving connection with the bull wheel, of a longitudinal shaft extending from the rear of the vehicle to the front portion thereof, driving means between the shaft and the bull wheel, an air impeller frame carried by the front portion of the tractor frame, air impeller operating mechanism supported by said frame and in driving connection with the longitudinal shaft, and means for longitudinally adjusting the air impeller frame with respect to said shaft.

2. The combination with a tractor frame having a bull wheel and a motor vehicle supported on said frame and in driving connection with the bull wheel, of a longitudinal shaft extending from the rear of the vehicle to the front portion thereof, driving means between the shaft and the bull wheel, an air impeller frame carried by the front portion of the tractor frame, air impeller operating mechanism supported by said frame and in driving connection with the longitudinal shaft, means for effecting pivotal engagement between the air impeller frame and the tractor frame, and means for holding the air impeller frame in a vertical position.

3. The combination with a tractor frame having a bull wheel and a motor vehicle supported on said frame and in driving connection with the bull wheel, of a longitudinal shaft extending from the rear of the vehicle to the front portion thereof, driving means between the shaft and the bull wheel, an air impeller frame carried by the front portion of the tractor frame, air impeller operating mechanism supported by said frame and in driving connection with the longitudinal shaft, means for effecting pivotal engagement between the air impeller frame and the tractor frame, means for holding the air impeller frame in a vertical position, and means for longitudinally adjusting the air impeller frame with respect to the tractor frame.

4. A tractor frame, a bull wheel on said tractor frame, a longitudinal shaft on the tractor frame and in driving connection with the bull wheel, means for rendering the driving connection between the shaft and bull wheel ineffective, an air impeller frame at the forward end of the tractor frame and in driving connection with the shaft, and a stream line directing hood carried by the impeller frame.

5. A tractor frame, a bull wheel on said tractor frame, a longitudinal shaft on the tractor frame and in driving connection with the bull wheel, means for rendering the driving connection between the shaft and bull wheel ineffective, an air impeller frame at the forward end of the tractor frame and in driving connection with the shaft, and a stream line directing hood carried by the impeller frame, said hood being adjustable with respect to the frame longitudinally of the tractor frame.

6. A tractor frame, a longitudinal driving shaft on said tractor frame, an air impeller frame carried by the tractor frame, an impeller mounted near the upper end of the impeller frame, a hood surrounding said impeller and having an end open in the direction of the rear of the tractor frame, driving mechanism for said impeller, and connection between the driving mechanism and the shaft.

7. A tractor frame, a longitudinal driving shaft on said tractor frame, an air impeller frame carried by the tractor frame, an impeller mounted near the upper end of the impeller frame, a hood surrounding said impeller and having an end open in the direction of the rear of the tractor frame, driving mechanism for said impeller, and connection between the driving mechanism and the shaft, said impeller frame being longitudinally adjustable with respect to the tractor frame and the shaft.

8. A tractor frame, a longitudinally disposed driving shaft on said tractor frame, means for operating said shaft, ball and socket bearings for said shaft, said bearings being mounted in spaced relation longitudinally of the tractor frame, an impeller frame at the forward end of the tractor frame, impeller driving mechanism carried by the frame, and means on the shaft for operating the impeller driving means.

9. A tractor frame, a longitudinal shaft on said tractor frame, means for driving it, a driving wheel longitudinally slidable on the forward end of the shaft, an air impeller, a frame therefor, supported at the forward portion of the tractor frame and longitudinally adjustable with respect thereto, driving connection between the driving wheel on the shaft, and impeller driving mechanism on the impeller supporting frame.

10. A motor vehicle provided with a radiator grid at the forward end thereof, an air impeller in front of the grid, and means for operating said impeller to augment the supply of air provided by the usual motor fan of the motor vehicle, said air impeller having swinging movement in a vertical plane toward and away from the radiator grid.

11. A motor vehicle provided with a radiator grid at the forward end thereof, an air impeller in front of the grid, means for operating said impeller to augment the supply of air provided by the usual motor fan of the motor vehicle, and a stream line directioning hood about the impeller and having an end open in the direction of the motor vehicle.

12. A motor vehicle having a radiator grid, an auxiliary fan in front of the grid, means for operating said fan from the motor vehicle, and a ring-shaped member surrounding said fan and directing the flow of air toward the radiator grid, said ring-shaped member being adjustable longitudinally of the motor vehicle and of the axis of the fan.

In testimony whereof I affix my signature.

GEORGE L. SCHOFIELD.